United States Patent [19]
Konig

[11] Patent Number: 5,749,689
[45] Date of Patent: May 12, 1998

[54] DRILL, PARTICULARY DRILLING SCREW

[75] Inventor: Gottfried Konig, Bad Laube, Germany

[73] Assignee: EJOT Verbindung Stechnik GmbH & Co. KG

[21] Appl. No.: 704,769

[22] PCT Filed: Mar. 7, 1995

[86] PCT No.: PCT/EP95/00841

§ 371 Date: Dec. 26, 1996

§ 102(e) Date: Dec. 26, 1996

[87] PCT Pub. No.: WO95/25901

PCT Pub. Date: Sep. 28, 1995

[30] Foreign Application Priority Data

Mar. 23, 1994 [DE] Germany .................. 44 10 027.2

[51] Int. Cl.⁶ .................. F16B 25/00; F16B 13/04
[52] U.S. Cl. .................. 411/387; 411/29; 408/231
[58] Field of Search .................. 411/29, 30, 31, 411/383, 387; 408/231, 232, 713

[56] References Cited

U.S. PATENT DOCUMENTS

| | | | |
|---|---|---|---|
| 4,480,951 | 11/1984 | Regensburger | 411/387 X |
| 5,184,925 | 2/1993 | Woods et al. | 408/231 X |
| 5,213,459 | 5/1993 | Palm | 411/29 |
| 5,551,818 | 9/1996 | Koppel | 411/29 X |

*Primary Examiner*—Neill R. Wilson
*Attorney, Agent, or Firm*—Banner & Witcoff, Ltd

[57] ABSTRACT

The invention relates to a drill with a drilling shank, particularly with a screw shank comprising a self-tapping thread, and with a fork-shaped hard-material plate-shaped drilling tip disposed opposite the driving end of the shank, said drilling tip being inserted into a holder in the shank, said holder comprising two grooves, disposed diametrically with respect to each other in the shank, for accommodating prongs of the drilling tip. The shank terminates bluntly in an essentially radial end surface from which the grooves extend towards the driving end in such a manner that exclusively the prongs of the drilling tip, pressed axially into the grooves, both hold the drilling tip self-lockingly on the shank and also transmit the torque from the shank to the drilling tip.

15 Claims, 2 Drawing Sheets

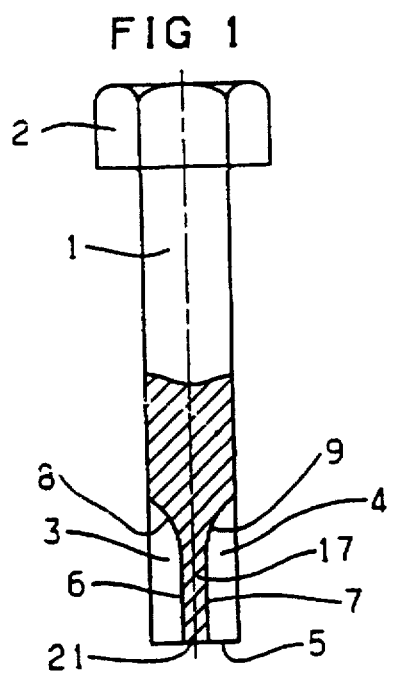
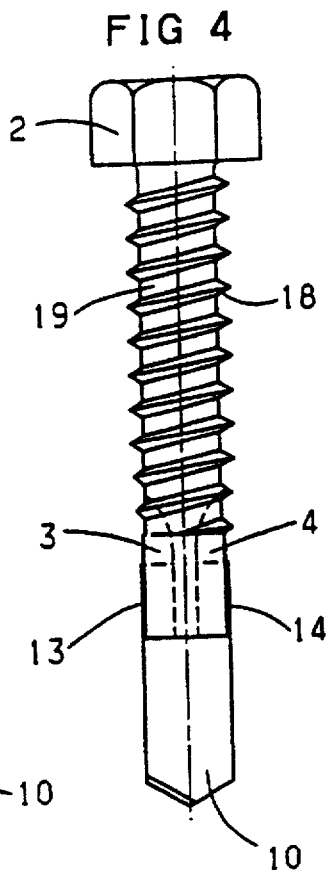
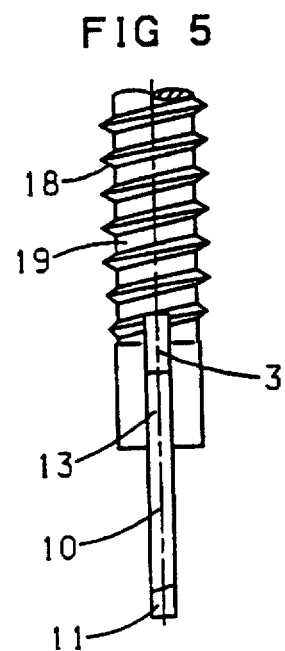
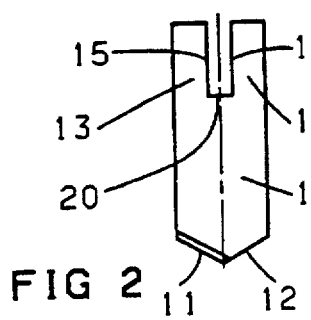
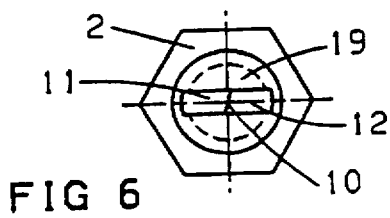
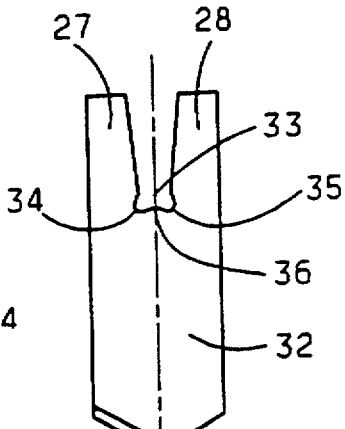
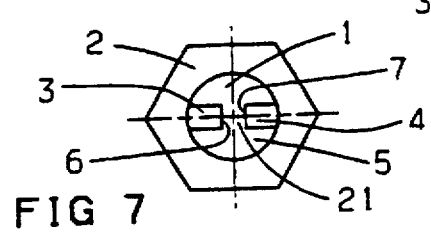
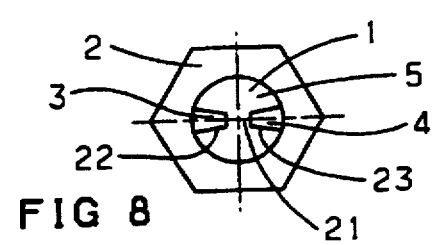
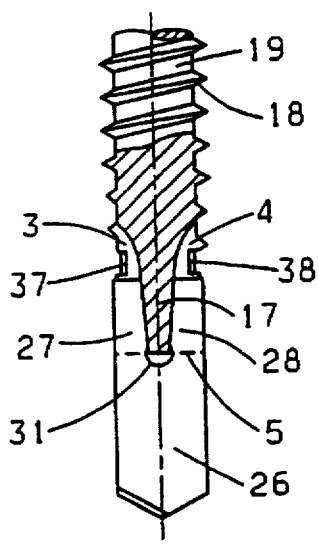

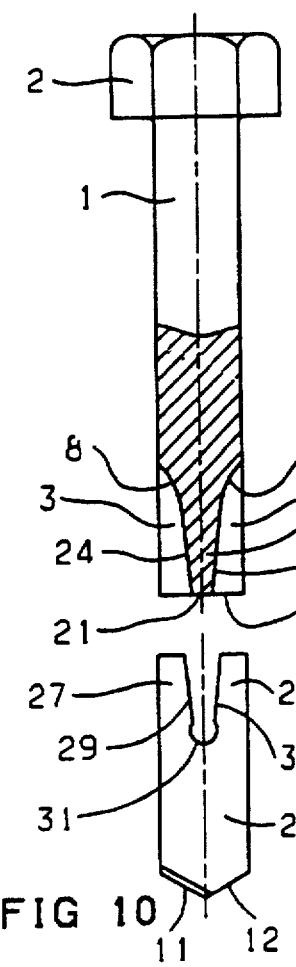
FIG 9
FIG 10
FIG 11
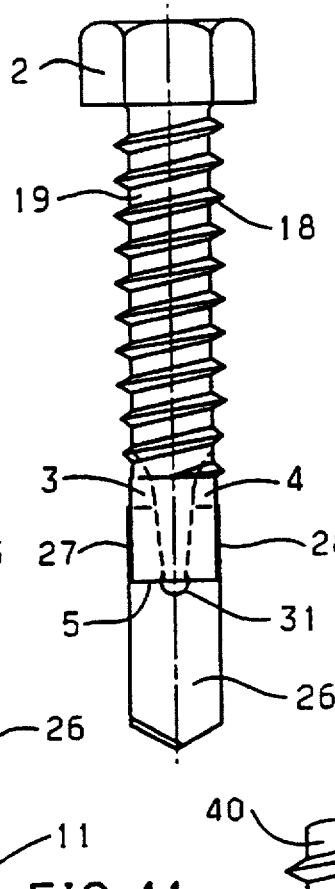
FIG 12
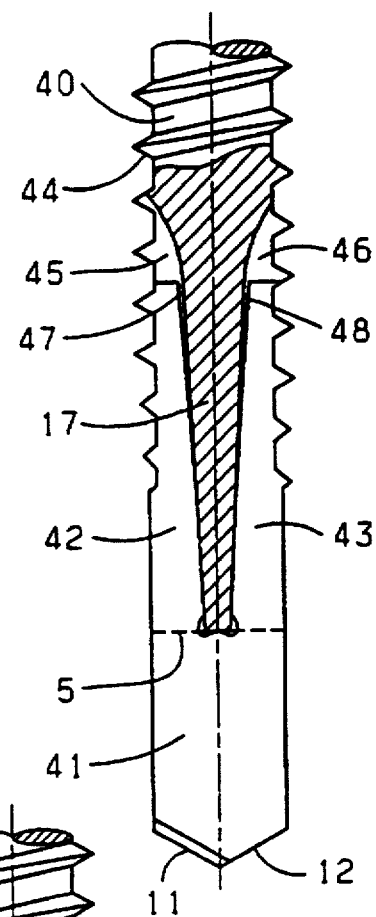
FIG 16
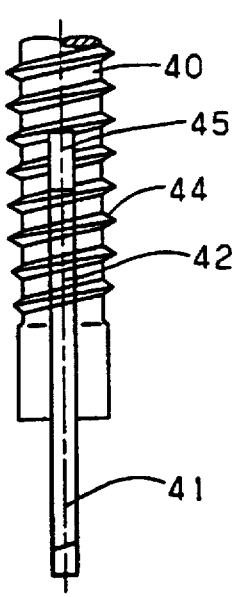
FIG 15
FIG 17
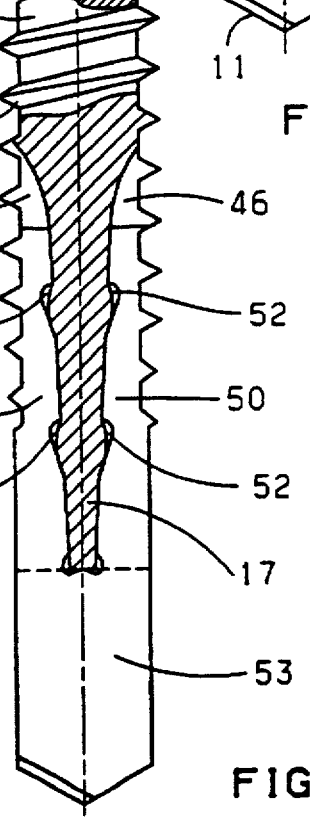
FIG 18

DRILL, PARTICULARY DRILLING SCREW

BACKGROUND OF THE INVENTION

The invention relates to a drill with a drilling shank, particularly with a screw shank comprising a self-tapping thread, and with a fork-shaped hard-material plate-shaped drilling tip disposed opposite the driving end of the shank, said drilling tip being inserted into a holder in the shank, said holder comprising two grooves, disposed diametrically with respect to each other in the shank, for accommodating prongs of the drilling tip. Therefore, the drill may also and preferably be a drilling screw owing to the design of its shank with a self-tapping thread.

Such a drill provided with a drilling tip is described in U.S. Pat. No. 3,715,952. In said drill, the drilling tip is inserted into a continuous transverse slot provided at the drilling end of the drilling shank, said transverse slot ensuring that the drive is transmitted to the drilling tip and the root of said transverse slot forming the abutment for the absorption of the axial drilling force, since the drilling tip is supported in its central region against the root of the transverse slot. At its lateral edges, the drilling tip comprises arms that extend axially with respect to the drilling shank and which taper away from the drilling tip, said tapering obviously serving to facilitate the introduction of the arms into additionally provided axial grooves in the drilling shank, which grooves are wider than the transverse slot. Said arms each contact just one wall of the grooves on one side and are thus capable of helping to transmit the torque from the drilling shank to the drilling tip, this, however, being restricted to that region of the arms that is not tapered. The grooves serve further to remove drilling chips or other drilled-out material and therefore leave sufficient space free next to the arms of the drilling tip. The end of the drilling shank facing the drilling tip is, therefore, of relatively complex geometry with its transverse slot and the widened grooves opposite the drilling tip.

A different method of attaching a drilling tip to the drilling shank of a drilling screw is disclosed in DE-PS 4 003 374, which is based on the principle of holding an extension of the drilling tip, said extension emanating from the centre of the drilling tip and being force-fitted into a central recess in the end of the screw shank facing the drilling tip. The axial drilling force is transmitted from the end face of the extension onto the root of the recess. In order to increase the torque which is transmitted through the positive and non-positive connection between extension and recess, the drilling tip is provided, next to the extension, with strips that project from the cutting tip, said strips—as shown in FIG. 14 of the publication—engaging correspondingly shaped grooves in the relevant end of the screw shank. The two strips, just like the grooves, extend parallel to each other and are of a length corresponding approximately to the depth of the recess, the ends of the strips maintaining a small distance from the ends of the grooves, with the result that, therefore, the axial drilling force is absorbed by the end face of the extension via the root of the recess. This design, too, of the relevant end of the screw shank is relatively complex, since, apart from the recess, it additionally comprises the two grooves. The publication also describes a variant on the above-explained design according to FIG. 14, the upshot being that the two grooves are replaced by an annular shoulder as deep as the grooves, with the result that, at the relevant end of the screw shank, next to the recess, there remains an annular collar which embraces the recess and, in any angular position of the drilling tip with respect to the screw shank, is capable of accommodating the two strips of the drilling tip, which, however, are then hardly able still to transmit a torque for lack of lateral abutments. Torque can then only be transmitted through the force-fit of the extension in the recess. The above-described designs of the connection of a drilling tip to the relevant end of a screw shank according to DE-PS 40 03 374 are, therefore, dominated by the idea of causing the drilling tip to be attached through the connection of extension and recess. The elaborate construction of the relevant end of the respective drilling shank results also in a corresponding design of the drilling tip, this correspondingly increasing the overall outlay on the drill.

The above-explained design according to DE-PS 40 03 374 is based on the fundamental consideration of providing the relevant end of the drilling shank with a central recess for holding the drilling tip. The prior art exhibits two variants for this purpose, namely a concentric hole with drilling tip soldered therein (DE-OS 25 55 647) or a central through-slot filled by the drilling tip (DE-PS 28 01 962). This basic design is followed also by DE-PS 40 03 374 on account of the central recess, disclosed therein, at the end of the drilling shank.

SUMMARY OF THE INVENTION

Conversely, the present invention adopts a fundamentally different approach. Its object is to simplify the design of the connection between a drilling shank or screw shank and a drilling tip, while guaranteeing the possibility of high torque transmission, it having to be guaranteed that the drilling tip is centred with respect to the axis of the drilling shank or screw shank. The object of the invention is achieved in that the shank terminates bluntly in an essentially radial end surface from which the grooves extend towards the driving end in such a manner that exclusively the prongs of the drilling tip, pressed axially into the grooves, both hold the drilling tip self-lockingly on the shank and also transmit the torque from the shank to the drilling tip. Given such a design of the drilling shank or screw shank, the blunt end of which can be produced without problem, it is sufficient, for the attachment of the drilling tip, merely to provide the two grooves situated diametrically with respect to each other. Such grooves can be pressed in or beaten in using suitable tools. It is also possible for the grooves to be cut in or slotted in by machining. There is no need, therefore, to pay attention to any particularly complex forming operation at the relevant end of the shank. Also of a correspondingly simple design is the plate-shaped tip, which, in addition to its actual drilling part, comprising merely two prongs. With these two prongs in conjunction with the grooves it is possible to guarantee both the self-locking holding of the drilling tip on the shank and also the transmission of torque, without further design components being required for this purpose. Furthermore, shank and drilling tip are assembled in extremely simple manner, namely merely by pressing the prongs of the drilling tip into the grooves, without this requiring any special forces, such as for the making of a force-fit. The pressing of the prongs into the grooves is accompanied automatically by the centering of the drilling tip, since the centering of the drilling tip is achieved automatically through the axial direction of the grooves. The overall result, therefore, is a simple design of a drill with drilling tip, characterized by a simplicity of manufacture and assembly.

The grooves in the region in which they accommodate the prongs may be positioned such that the grooves extend parallel to each other, this permitting the simple production of the grooves. The self-locking effect results from the adaptation of the prongs to the cross section of the grooves.

It is also possible for the grooves to extend obliquely with respect to the axis of the shank towards the driving end with increasing distance between their roots such that the prongs, pressed into the grooves, are self-lockingly held in the grooves owing to the expansion force exerted on the prongs by the oblique position of the roots. Said expansion force is created when the prongs are forced in, owing to the oblique position of the roots.

The self-locking holding of the prongs in the grooves can be intensified in that the width of the grooves is such that the prongs are jammed in place by the walls of the grooves.

The self-locking of the prongs when forced into the grooves can also be guaranteed in the following manner. Firstly, the prongs may be in preloaded contact with the roots; secondly, the grooves may be so designed that the width of the grooves increases radially outwards and the prongs have a cross section adapted to the shape of the grooves. In the latter case, it is sufficient if the prongs come into contact only with the walls of the grooves, without their extending as far as the roots of the grooves, because the increase in the width of the grooves means that the correspondingly shaped prongs are, to a certain extent, pressed in wedge-like manner into the grooves and become wedged therein.

A further possibility for achieving the self-locking consists in that the grooves are designed such that the width of the grooves decreases towards the driving end and the prongs have a cross section adapted to the shape of the grooves. In this case, there is a kind of impacting of the prongs when they are inserted into the grooves with respect to the decrease in the width of the grooves, as a result of which the prongs become wedged in the grooves in the axial direction.

An additional possibility for restricting the expansion forces acting on the prongs in the case of an especially high axial drilling force consists in that the radial contact of the prongs with the roots or walls of the grooves is restricted to the initial region of the prongs in the vicinity of the end surface of the shank. In this case, the expansion forces acting on the prongs are able to have an effect only in the initial region of the prongs, where the lever arm thereof is considerably shorter than at the end of the prongs. If the grooves and the prongs are designed in such a manner that the prongs are in contact with the roots of the grooves, this means that only in the initial region of the prongs are the latter in contact with the roots, while, in the continuation of the prongs, the latter maintain a small distance from the roots of the grooves. However, the prongs remain responsible for transmitting the torque, since, irrespective of the special design of the initial region of the prongs and the distance of the prongs from the roots in the end region, the prongs are still able to support themselves on the walls of the grooves. The initial region of the prongs in the vicinity of the end surface should be construed, for example, as a length of approximately one-third of the total length of the prongs.

In order to increase the safety and reliability of the self-locking of the prongs in the relevant end of the shank, the prongs may be provided, on their sides facing the roots of the grooves, with recesses into which is forced the material displaced during the cold-working of the screw shank. Such cold-working may involve compression in the region of the prongs after the drilling tip has been inserted, wherein, through the application of pressure to the material of the end of the shank, said material is caused to flow into the recesses. The drilling tip is in this case particularly secured against dropping out of the grooves. Cold-working may also be achieved in that use is made for this purpose of the rolling of a thread onto the shank, which, in this case, takes place with the drilling tip inserted, a considerable pressure being exerted on the material of the shank. Under this pressure, the material is then displaced from the shank into the recesses on the prongs.

The cold-working of a thread, particularly the rolling of the thread onto the shank, can also be made use of in order to provide the prongs on their outside with a longitudinal profile similar to the thread cross section, for which purpose the grooves and the prongs are designed in such a manner that they extend into the thread of the shank. When the thread is rolled, the surface of the shank is then correspondingly cold-worked together with the outsides of the prongs; that is, in the region of the prongs, the thread which has been rolled onto the surface of the shank is continued in the prongs. This is of advantage if the hard material of the drilling tip and thus of the prongs is to be made use of in order to form or cut a thread into material of poor drillability, e.g. non-rusting material.

In order in particular manner to guarantee the self-locking when using the obliquely extending grooves, the throat formed at the convergence of the two prongs may be designed such that it maintains a distance from the end surface of the shank. This ensures that, when it is being inserted into the grooves, the drilling tip is unable, in the region of its throat, to come up against the end surface of the shank before the prongs impact on the roots of the grooves, which would prevent the prongs from coming into contact with the roots of the grooves, such contact being required for self-locking.

Particularly high axial drilling forces can be favourably absorbed if a stop is provided in the connection between shank and drilling tip. Such a stop may advantageously be disposed in a groove. It is, however, also possible to provide a stop in the throat formed at the convergence of the two prongs, said stop coming into contact against the end surface of the shank when the drilling tip is inserted. With such a design, however, it must be ensured that, if use is made of oblique grooves, said stop does not take effect before the prongs have impacted on the roots of the grooves, as explained hereinbefore.

In order, when the prongs impact on the roots of the grooves or on the wedge-shaped groove walls, to prevent the expansion forces, occurring at the throat of the prongs, from increasing to such an extent that there is the danger of the prongs breaking at that point, the throat may advantageously be rounded in form, this providing the stress lines inside the relevant end of the prongs with a rounded-off, favourable curve.

It is possible for especially high torques to be transmitted if the width of the throat is smaller than the width of a prong in the region of the throat. In this case, namely, each prong contacts the correspondingly high wall of the relevant groove with a correspondingly large surface in the region of the throat.

BRIEF DESCRIPTION OF THE DRAWING

Examples of embodiments of the invention are represented in the drawings, in which:

FIG. 1 shows a drilling shank with a holder, drawn in section, for accommodating a drilling tip with parallel extending prongs;

FIG. 2 shows the drilling tip, fitting the drilling shank according to FIG. 1, in a position from which it can be pressed into the holder of the drilling shank;

FIG. 3 shows the drilling tip in a side view;

FIG. 4 shows the threaded drilling shank according to FIG. 1 together with the drilling tip according to FIG. 2;

FIG. 5 shows a detail from the representation according to FIG. 4 in a side view;

FIG. 6 shows the representation of the drill with screw shank according to FIG. 4 with axial viewing direction onto the cutting edges of the drilling tip;

FIG. 7 shows a drilling shank according to the representation in FIG. 1 in an identical view to FIG. 6, but without inserted drilling tip with grooves of rectangular cross section;

FIG. 8 shows a modification of the arrangement according to FIG. 7 with grooves of approximately wedge-shaped cross section;

FIG. 9 shows a drilling shank similar to the representation according to FIG. 1 with obliquely extending grooves;

FIG. 10 shows a drilling tip which fits into the drilling shank according to FIG. 9;

FIG. 11 shows the side view of the drilling tip according to FIG. 10;

FIG. 12 shows a screw shank according to the representation in FIG. 9 with inserted drilling tip according to FIG. 10;

FIG. 13 shows a drilling tip similar to the representation according to FIG. 10, with a stop in the throat between the prongs;

FIG. 14 shows a detail from a screw shank with inserted drilling tip similar to the arrangement according to FIG. 12, with stops in the region of the grooves;

FIG. 15 shows a side view of a screw shank with inserted drilling tip similar to the representation according to FIG. 5, but with grooves whose width decreases towards the driving end;

FIG. 16 shows a drilling shank similar to the representation according to FIG. 12 with inserted drilling tip, the thread of the screw shank partially extending over the prongs of said drilling tip;

FIG. 17 shows the arrangement according to FIG. 16 in side view; and

FIG. 18 shows an arrangement similar to FIG. 16 with internal recesses on the prongs.

DESCRIPTION OF THE PREFERRED EMBODIMENTS

FIG. 1 shows a drilling shank 1 which is provided at its driving end 2 with a hexagonal head, the purpose of which, for example, is to be clamped into some sort of driving tool. The lower part of the drilling shank 1 is shown in section; it contains the two grooves 3 and 4, which extend from the end surface 5 of the drilling shank 1 towards the hexagonal head. The position and cross section of the grooves 3 and 4 become apparent from the end-face view in FIG. 7, which will be discussed in greater detail hereinbelow.

The roots 6 and 7 of the grooves 3 and 4 extend over the essential part of the length of the grooves 3 and 4 parallel to each other and parallel to the longitudinal axis of the drilling shank 1. They terminate in rounded sections 8 and 9, attributable here to the shape of a circular saw, by means of which the grooves 3 and 4 can be made in the drilling shank 1.

In addition, the grooves 3 and 4 may also be formed by any other method, such as by slotting or pressing, to which reference has already been made hereinbefore.

The grooves 3 and 4 form the holder for the drilling tip 10 shown in FIGS. 2 and 3, said drilling tip 10 being provided, at its drilling end, with the two cutting edges 11 and 12 and, at its end facing away from the cutting edges 11 and 12, with the two fork-shaped prongs 13 and 14. The insides 15 and 16 of the two prongs 13 and 14 extend axially and parallel to each other and maintain such a distance from each other that the drilling tip can be slid snugly onto the bridge 17 remaining between the two grooves 3 and 4, the prongs 13 and 14 coming into contact with the walls of the grooves 3 and 4 as a result of the adaptation of the thickness of the drilling tip 10 to the width of the grooves 3 and 4 or vice versa. The prongs 13 and 14 are of such length that they do not extend into the region of the rounded sections 8 and 9, with the result that, in order to form the prongs 13 and 14, it is necessary merely to produce a space with parallel sides. If, however, it is desired that the prongs 13 and 14 should extend further into the region of the grooves 3 and 4, then the ends of the prongs 13 and 14 should, as appropriate, be of a shape to match the rounded sections 8 and 9.

FIG. 3 shows the side view of the drilling tip 10 according to FIG. 2, said drilling tip 10 being throughout of uniform thickness adapted to the width of the grooves 3 and 4. Such a drilling tip may, for example, be approximately 1 mm thick. The holes to be drilled with such drilling tips are usually of a diameter of up to approx. 5 mm.

From the positions of drilling shank 1 and drilling tip 10 as shown in FIGS. 1 and 2, these two parts can be assembled by pressing the prongs 13 and 14 of the drilling tip 10 into the grooves 3 and 4, this resulting in the arrangement according to FIG. 4, which, however, in contrast to the drilling shank 1 shown as being smooth in FIG. 1, is provided with the thread 18, which has been rolled onto a corresponding diameter, this then resulting in the screw shank 19 represented in FIG. 4. Situated at the end of the screw shank 19 facing away from the hexagonal head 2 is the drilling tip 10, the prongs of which (which prongs, for reasons of better graphic representation, are shown here as projecting laterally slightly beyond the outside diameter of the drilling shank 19) have been pressed into the grooves 3 and 4.

FIG. 5 shows the arrangement from FIG. 4 in a side view, from which it becomes clearly apparent where the prongs (in this case: the prong 13) terminate in the grooves (in this case: the groove 3).

Additional reference is made to FIG. 6, in which the screw shank 19 with inserted drilling tip 10 is represented as viewed from the side of the drilling tip.

On account of the snug fit of the prongs 13 and 14 in the grooves 3 and 4, there results a self-locking connection between shank 1 or 19 and drilling tip 10. Having been pressed in, the drilling tip 10 can no longer on its own drop out of the holder (formed by the grooves 3 and 4) on the shank 1 or 19. Normally, there is no need for additional securing of the drilling tip 10 against dropping out, because the drilling tip 10 is loaded essentially by axial drilling force acting on the cutting edges 11 and 12 in the direction of the shank 1 or 19. During drilling, therefore, the drilling tip 10 is constantly pressed against the shank 1 or 19, the rectangularly formed throat 20, acting as a stop, coming up against the end face 21 of the bridge 17, this forming the abutment required for the absorption of the drilling force.

The torque to be transmitted from the shank 1 or 19 to the drilling tip 10 is transferred from the driven hexagonal head 2 via the walls of the grooves 3 and 4 to the prongs 13 and 14, this resulting in a both positive and non-positive connection comprising exclusively the grooves 3 and 4 and the prongs 13 and 14 without any other components. At the same time, the prongs 13 and 14 ensure the self-locking connection between shank 1 or 19 and drilling tip 10, with the result that the function of the self-locking connection and of torque transmission is effectively concentrated on the prongs 13 and 14.

With regard to the design of the end surface 5 of the shank 1 or 19, this does not result in any special form-related requirements, because the end surface 5 is able to extend radially and therefore is not subject to any special machining requirements. Of course, it is not necessary for the end surface 5 to be flat. If the shank 1 or 19 is made using blanks that, at their end opposite the hexagonal head 2, are of a design that differs insignificantly from the flat, i.e. is blunt, then it is also possible, of course, to employ such a design, since the end surface 5 needs merely to comprise the end face 21 for the formation of the stop as explained hereinbefore, said stop being formed automatically when the grooves 3 and 4 are made. An essentially radially extending and flat end surface 5 is of advantage because such an end surface normally arises automatically during the production of the herein relevant shanks 1 or 19 and, moreover, because the grooves 3 and 4 with their walls are of the maximum-possible longitudinal extent for transmitting the torque to the prongs 13 and 14.

FIG. 7, briefly mentioned hereinbefore, shows the drilling shank 1 in a top view of the end surface 5, without the drilling tip inserted. It becomes apparent herefrom that the grooves 3 and 4 are of a rectangular cross section, said cross section then being snugly filled, when drilling shank 1 and drilling tip 10 are assembled, by the prongs 13 and 14 of the drilling tip 10 (said prongs 13 and 14 not visible in FIG. 7), this resulting in the self-locking connection between drilling tip and shank.

FIG. 8 shows a variant on the embodiment according to FIG. 7, in which variant the grooves 3 and 4 are of a form in which their width increases radially outwards. Consequently, the grooves 3 and 4 have obliquely extending walls 22 and 23, which impart something of a wedge shape to the cross section of the grooves 3 and 4, this resulting in the particular jamming-in-place of the prongs inserted into said grooves. The oblique position of the walls 22 and 23 (and, of course, also of the opposite walls) is exaggerated in FIG. 8 in order to provide more graphic illustration in the drawing. In practice, the oblique position differs only very slightly from a straight line, in order thereby to achieve particularly firm clamping.

FIGS. 9 to 12 show variants on the embodiments from FIGS. 1 to 5, in which variants the grooves 3 and 4 are provided with a special shape. Said shape consists in that the grooves 3 and 4 extend obliquely with respect to the axis of the drilling shank 1, with the distance between the roots 24 and 25 increasing towards the hexagonal head. This therefore results in a wedge-like shape of the bridge 17, which then, as in the embodiments according to FIGS. 1 to 5, terminates in the end face 21 inside the end surface 5. The drilling tip 26 to match this form of holder on the drilling shank 1 is shown in top and side views in FIGS. 10 and 11 (similar to the representations in FIGS. 2 and 3). The drilling tip 26 comprises the two prongs 27 and 28, appropriately formed to suit the oblique position of the roots 24 and 25, the insides 29 and 30 of said prongs 27 and 28 having essentially the same oblique position as the roots 24 and 25 of the bridge 17.

When the drilling tip 26 is pressed in, the approximately wedge-shaped design of the bridge 17 causes the insides 29 and 30 to impact on the obliquely extending roots 24 and 25, with the result that the prongs 27 and 28 are subjected to an expansion force through which the drilling tip 26 is held particularly securely on the holder of the drilling shank 1.

FIG. 12 shows the assembly of a screw shank 19 and the drilling tip 26, which assembly results basically from the drilling tip 26, as shown in FIG. 10, being pressed into the grooves 3 and 4 of the thereabove drawn drilling shank 1. The difference between the drilling shank 1 according to FIG. 9 and the screw shank 19 according to FIG. 12 consists only in respect of the provision of the thread 18, as has already been described hereinbefore in conjunction with FIGS. 1 and 4. It can be seen from FIGS. 10 and 12 that the throat 31, formed at the end of the prongs 27 and 28, is rounded in form. This rounding is provided in order to reduce the stress acting in the region of the throat 31 as a result of the spreading-apart of the prongs 27 and 28 and in order to prevent the excessive concentration of stress lines at the point in question.

Apart from the oblique position of the roots 24 and 25 of the grooves 3 and 4 and the rounded form of the throat 31, the embodiment according to FIGS. 9 to 12 is identical to the embodiment according to FIGS. 1 to 5, with the consequence that, for further explanation, reference may be made to FIGS. 1 to 5.

In the embodiment according to FIGS. 9 to 12, the drilling force occurring during drilling is absorbed by the contact of the insides 29 and 30 of the prongs 27 and 28 against the roots 24 and 25. The drilling tip 26, consisting of hard material, is normally able to absorb the forces exerted on the prongs 27 and 28. If, however, it is necessary for particularly high drilling forces to be transmitted, it may be advantageous also to provide the embodiment according to FIGS. 9 to 12 with a stop (similar to the effect of the end face 21 and of the throat 20 according to FIGS. 1 and 2).

A corresponding embodiment is shown in FIG. 13. Although the throat 33 contained in the drilling tip 32 is essentially also provided with rounded sections 34 and 35, disposed between said two rounded sections is the rounded projection 36, the purpose of which is, when the drilling tip 32 is being pressed into the grooves 3 and 4 of the drilling shank 1 or of the screw shank 19, to come up against the end face 21, this making it possible for particularly high drilling forces to be transmitted directly from the end face 21 to the projection 36. Apart from this special feature, the drilling tip 32 is otherwise completely identical to the drilling tip 26 according to FIGS. 10 and 11.

FIG. 14 shows a further possibility for forming a stop. In this case, a stop is formed by the shoulders 37 and 38, which are forced from the material of the screw shank 19 into the grooves 3 and 4. In the drawing according to FIG. 14, the ends of the prongs 27 and 28, opposite the shoulders 37 and 38, maintain a slight distance, since, in the normal operating case, the strength of the prongs 27 and 28 is sufficient to absorb the occurring drilling forces. If, however, said drilling forces exceed a certain level, then the drilling tip 26 can be pressed further into the grooves 3 and 4 until it then comes into contact with the shoulders 37 and 38 with the ends of its prongs 27 and 28.

FIG. 15 shows a further form in which clamping can be achieved between drilling tip and holder in the shank. FIG. 15 shows the lower section of a screw shank 19 with thread 18 and with drilling tip 39 inserted into the grooves 3 (not visible 4) of said screw shank 19. The drawing shows that the width of the grooves 3 (and 4) decreases towards the driving end of the screw shank 19, the prongs 27 (not visible 28) being of a cross section adapted to the shape of the grooves 3 and 4. The cross section of the grooves 3 and 4 and the prongs 27 and 28, therefore, are similar in profile to a wedge shape, this ensuring that, when the prongs 27 are pressed into the grooves 3 (not visible 28 and 4), there is a strong wedging and thus self-locking of the prongs 27 and 28 of the drilling tip 39.

FIG. 16 shows a connection between a screw shank 40 and a drilling tip 41, wherein the thread 44 extends as far as the ends of the prongs 42 and 43. This is achieved in that the grooves 45 and 46 are of corresponding length at the end of the screw shank 40 and the prongs 42 and 43 extend over virtually the entire length of the grooves 45 and 46. That the thread extends into the prongs 42 and 43 is produced in that the thread 44 is rolled onto the blank for the threaded shank 40 with the drilling tip 41 inserted. The rolling tools are applied also to the prongs 42 and 43 and, consequently, roll the thread 44 thereon, with the result that the longitudinal profile of the prongs follows the thread, as is apparent from FIG. 16.

The uniform transition of the thread 44 from the screw shank 40 to the region of the prongs 42 and 43 can clearly be seen in FIG. 17, which shows a view turned through 90° of the arrangement according to FIG. 16.

FIG. 16 shows a further special feature of the connection between shank 40 and drilling tip 41. In this case, in their end region facing the screw shank 40, the prongs 42 and 43 recede from the roots of the grooves 45 and 46, with the result that there is the gap 47 and 48, apparent from FIG. 16, between the insides of the prongs 42 and 43 and the roots of the grooves 45 and 46. This ensures that the contact of the prongs 42 and 43 is restricted to the ends of the prongs 42 and 43 facing the cutting edges 11 and 12, it thereby being ensured that the expansion forces resulting when the drilling tip 41 is inserted do not become excessive.

The method, presented in conjunction with FIGS. 16 and 17, of rolling the thread onto the ends of the prongs can also be utilized to provide the drilling tip 53, through the special design of its prongs, with a special form of fixing to the drilling shank 40. This is represented in FIG. 18. In this case, the prongs 49 and 50 each comprise on their insides two recesses 51 and 52, into which recesses 51 and 52 material from the bridge 17 is pressed when the thread 44 is rolled. This results in a type of hooking-together between the prongs 49 and 50 and the bridge 17 and thus with respect to the screw shank 40.

What is claimed is:

1. Drill with a drilling shank (1), particularly with a screw shank (19, 40) comprising a self-tapping thread (18), and with a fork-shaped hard-material drilling tip (10, 26, 32, 39, 41, 53) disposed opposite the driving end (2) of the shank (1, 19, 40), said drilling tip (10, 26, 32, 39, 41, 53) being inserted into a holder in the shank (1, 19, 40), said holder comprising two grooves (3, 4; 45, 46), disposed diametrically with respect to each other in the shank (1, 19, 40), for accommodating prongs (13, 14; 27, 28; 42, 43; 49, 50) of the drilling tip (10, 26, 32, 39, 41, 53), the width of said drilling tip (10, 26, 32, 39, 41, 53) corresponding to the diameter of the drilling shank (1), characterized in that the shank (1, 19, 40) terminates bluntly in an essentially radially flat end surface (5) from which the grooves (3, 4; 45, 46) extend towards the driving end (2) in such a manner that exclusively the two prongs (13, 14; 27, 28; 42, 43; 49, 50) of the drilling tip (10, 26, 32, 39, 41, 53), pressed axially into the grooves (3, 4; 45, 46) and snugly seated therein, hold the drilling tip (10, 26, 32, 39, 41, 53) self-lockingly on the shank (1, 19, 40), the torque being transmitted from the shank (1, 19, 40) via the walls of the grooves (3, 4; 45, 46) to the two prongs (13, 14; 27, 28; 42, 43; 49, 50).

2. Drill according to claim 1, characterized in that the roots (6, 7) of the grooves (3, 4) extend parallel to each other in the region in which they accommodate the prongs (13, 14) (FIGS. 1–7).

3. Drill according to claim 1, characterized in that the grooves (3, 4) extend obliquely to the axis of the shank towards the driving end (2) with increasing distance between their roots (24, 25) such that the prongs (27, 28), pressed into the grooves (3, 4), are self-lockingly held in the grooves (3, 4) owing to the expansion force exerted on the prongs (27, 28) by the oblique position of the roots (24, 25) (FIGS. 9–12).

4. Drill according to claim 1, characterized in that the width of the grooves (3, 4) is such that the prongs (13, 14) are jammed in place by the walls of the grooves (3, 4).

5. Drill according to claim 1, characterized in that the prongs (13, 14) are in preloaded contact with the roots (6, 7) of the grooves (3, 4).

6. Drill according to claim 1, characterized in that the width of the grooves (3, 4) increases radially outwards and the prongs have a cross section adapted to the shape of the grooves (FIG. 8).

7. Drill according to claim 1, characterized in that the width of the grooves (3, 4) decreases towards the driving end (2) and the prongs (27, 28) have a cross section adapted to the shape of the grooves (FIG. 15).

8. Drill according to claim 1, characterized in that the radial contact of the prongs (42, 43) with the roots or walls of the grooves (45, 46) is restricted to the initial region of the prongs (42, 43) in the vicinity of the end surface (5) of the shank (40) (FIG. 16).

9. Drill with screw shank, the thread of which is cold-worked, particularly rolled, according to claim 1, characterized in that the grooves (45, 46) and the prongs (42, 43) extend into the thread (44) of the screw shank (40), where the longitudinal profile of the prongs (42, 43) follows the thread (44) (FIGS. 16, 17).

10. Drill according to claim 1, characterized in that the prongs (49, 50) are provided, on their sides facing the roots of the grooves, with recesses (51, 52) into which is forced the material displaced during the cold-working of the screw shank (40) (FIG. 18).

11. Drill according to claim 1, characterized in that, in order to absorb an axial drilling force, a stop (37, 38) is disposed in a groove (3, 4) (FIG. 14).

12. Drill according to claim 1, characterized in that the prongs (27, 28) join together in a throat (33), said throat (33) forming a stop (36) against the end surface (21) of the shank (1, 19) in order to absorb an axial drilling force (FIG. 13).

13. Drill according to claim 1, characterized in that the throat (31) is rounded in form (FIGS. 10, 12).

14. Drill according to claim 1, characterized in that the prongs (27, 28) join together in a throat (31), said throat (31) maintaining a distance from the end surface (5) of the shank (1, 19) when the drilling tip (26) is inserted (FIGS. 9–12).

15. Drill according to claim 12, characterized in that the width of the throat (20, 31) is smaller than the width of a prong (13, 14; 27, 28; 42, 43; 49, 50) in the region of the throat.

* * * * *